United States Patent [19]

Sato et al.

[11] Patent Number: 4,800,401
[45] Date of Patent: Jan. 24, 1989

[54] LIGHT SCANNING DEVICE FOR SCANNING WITH A LASLER BEAM AND AN IMAGE FORMING APPARATUS FOR FORMING AN IMAGE WITH A LASER BEAM

[75] Inventors: Hideki Sato, Tokyo; Teruo Komatsu, Yokohama; Yoshinori Sugiura, Kawasaki, all of Japan

[73] Assignee: Canon Kabushiki Kaisha, Tokyo, Japan

[21] Appl. No.: 850,829

[22] Filed: Apr. 11, 1986

[30] Foreign Application Priority Data

Apr. 15, 1985 [JP] Japan ............................ 60-54763[U]

[51] Int. Cl.⁴ .............................................. G01D 9/42
[52] U.S. Cl. .................................... 346/108; 361/293; 358/296
[58] Field of Search ................. 346/108, 107 R, 76 L, 346/160; 361/293, 289, 214, 221; 174/50; 358/296, 302, 285, 292, 293, 300; 400/118, 119

[56] References Cited

U.S. PATENT DOCUMENTS 4,297,713 10/1981 Ichikawa ............................ 346/108
4,307,431 12/1981 Sone ................................... 361/214

FOREIGN PATENT DOCUMENTS 53-59440  6/1978 Japan .
59-23320  2/1984 Japan ................................ 358/285
59-112763 6/1984 Japan ................................ 358/302

Primary Examiner—E. A. Goldberg
Assistant Examiner—Mark Reinhart
Attorney, Agent, or Firm—Fitzpatrick, Cella, Harper & Scinto

[57] ABSTRACT

A light scanning device has a light deflecting member such as a polygon mirror rotated to thereby scan with a light, a bearing member for rotatably supporting the light deflecting member, a supporting member for holding the bearing member, and a base member formed integrally as a one-piece construction with the supporting member. The light deflecting member is accurately held relative to the base member by the highly accurately provided supporting member. The light scanning device is characterized by the integral molding for improving the accuracy of an optical system member which has heretofore been made discretely and thereafter coupled to the base member, and is preferably characterized by the integral molding of a supporting portion (a positioning and containing portion) for supporting a plurality of optical system members relative to the base member.

78 Claims, 9 Drawing Sheets

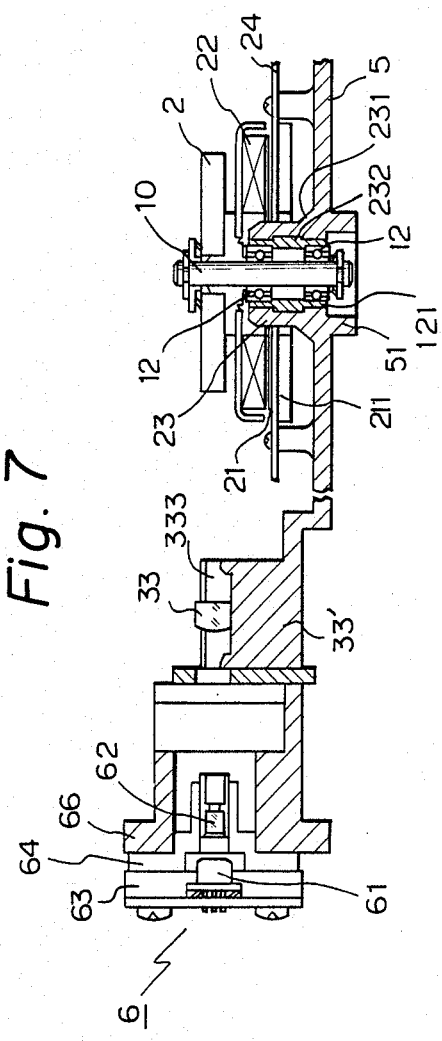
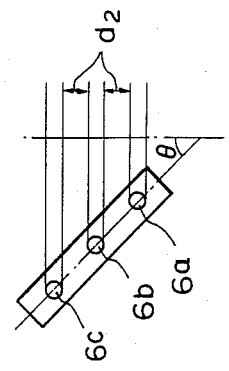
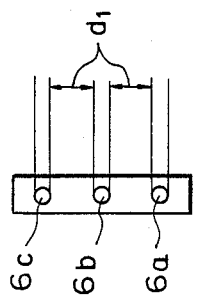
Fig. 7
Fig. 8A
Fig. 8B

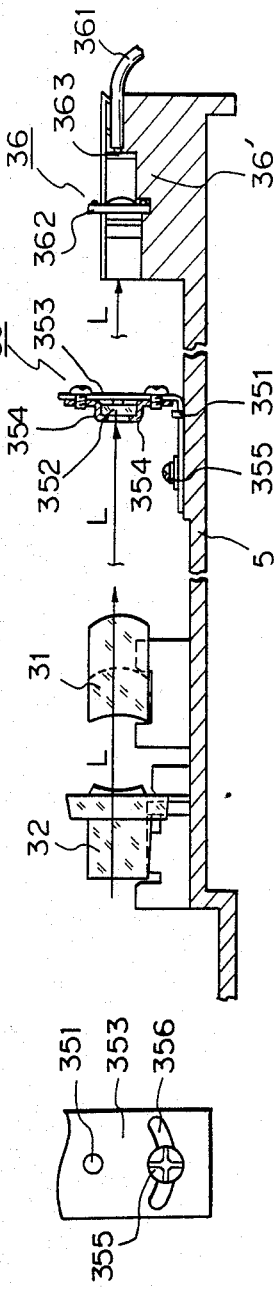
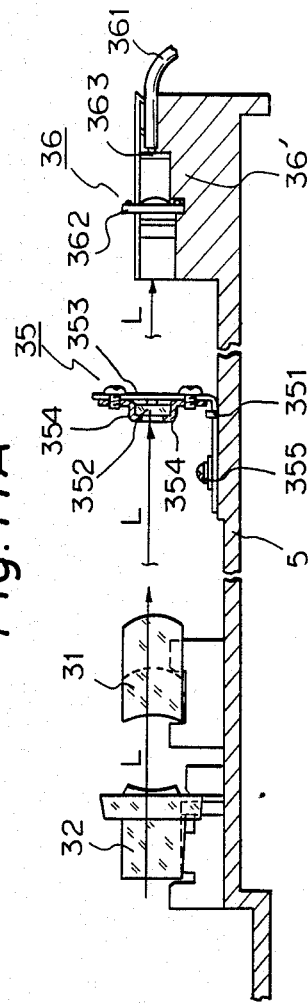
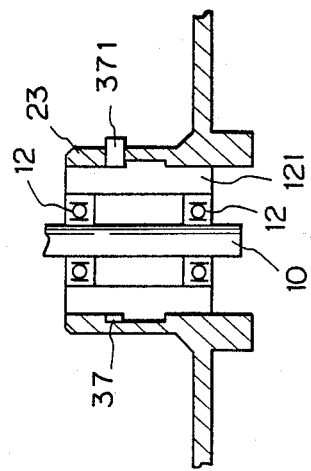
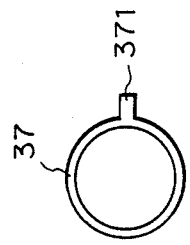

LIGHT SCANNING DEVICE FOR SCANNING WITH A LASLER BEAM AND AN IMAGE FORMING APPARATUS FOR FORMING AN IMAGE WITH A LASER BEAM

BACKGROUND OF THE INVENTION

1. Field of the Invention

This invention relates to a light receiving device used in an image forming apparatus such as a laser beam printer or a laser copying apparatus for scanning with a light beam such as a laser beam and effecting image formation or a measuring machine such as a bar code reader or a laser measuring machine, and to an image forming apparatus using the light scanning device.

2. Related Background Art

As a light scanning device for scanning with a light beam such as a laser beam, a device in which a rotational polygon mirror is rotated to scan with a light is widely used. Heretofore, this rotational polygon mirror was incorporated into a molding assembled integrally with a driving unit, and mounted on a predetermined position on a support plate.

This state is shown in FIGS. 15 and 16 of the accompanying drawings. As shown in FIG. 15 of the accompanying drawings, a rotational polygon mirror 2 is assembled integrally with a driving unit 7, and a scanner comprising the rotational polygon mirror 2 and the driving unit 7 is set in a mating hole 9 in the support plate 4 of FIG. 15 and held by a keep plate.

As shown in FIG. 16, a rotary support shaft 10 is supported by bearings 12 which in turn are held by a holding member 17 which is adhesively secured to another member.

In the conventional construction wherein the rotational polygon mirror is incorporated onto the support plate 4, in order to maintain the position of the rotational polygon mirror, particularly, the position of the rotary support shaft, with high accuracy, it has been necessary to comply with numerous requirements such as the coaxiality of the mating hole 9 with the rotational polygon mirror and the mountability of the rotational polygon mirror onto the support plate, and such works have required cumbersomeness and skill which have hampered mass-productivity, the great number of parts used has also led to a problem that 20 it is difficult to maintain a high dimensional accuracy and the optical performance is liable to become irregular. Also, where such a construction is used in a laser beam printer, it has sometimes been the case that images are disturbed or detection of the beam becomes impossible.

SUMMARY OF THE INVENTION

It is an object of the present invention to provide an optical scanning device in which the mounting accuracy of rotational light scanning means can be easily secured and moreover the number of the parts of a driving unit for rotating the rotational light scanning means can be reduced to greatly improve the optical performance, and which can be mass-produced and is of low cost.

It is another object of the present invention to provide a casing of a light scanning device which permits an optical member to be mounted accurately.

It is still another object of the present invention to provide a light scanning device in which fine adjustment of a laser beam travelling toward light scanning means can be accomplished simply and with good optical path accuracy.

It is yet still another object of the present invention to provide a light scanning device which can detect the beam scanning position highly accurately.

It is a further object of the present invention to provide an image forming apparatus using a light scanning device which ensure that highly accurate, clear-cut and undisturbed images are provided.

Further objects of the present invention will become apparent from the following detailed description.

BRIEF DESCRIPTION OF THE DRAWINGS

FIG. 7 is a cross-sectional view showing a laser output unit to light scanning means in the embodiment of the present invention.

FIGS. 8A and 8B illustrate generation of a plurality of laser beams in the present invention.

FIG. 11A is a cross-sectional view showing a beam detecting mechanism according to an embodiment of the present invention.

FIG. 11B is a top plan view illustrating the beam detecting mechanism according to the embodiment of the present invention.

FIG. 12A is a top plan view showing an electrode according to an embodiment of the present invention which is to be grounded.

FIG. 12B is a cross-sectional view of an embodiment of a grounding mechanism using the electrode shown in FIG. 12A.

DESCRIPTION OF THE PREFERRED EMBODIMENTS

Figure 1:
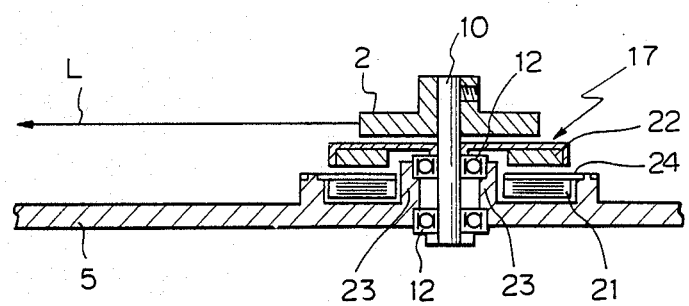
FIGS. 1, 2, 3 and 4 are cross-sectional views of an embodiment showing the light scanning means of the present invention.

The invention will hereinafter be described with reference to the drawings throughout in which functionally similar members are given similar reference numerals.

Description will be made with the present invention divided into the following items:

(1) A light scanning means holding mechanism;
(2) An imaging member holding mechanism;
(3) A laser output unit holding and lens adjusting mechanism;
(4) A beam detector holding mechanism;
(5) A countermeasure for preventing noise;
(6) Light scanning by a plurality of laser beams; and
(7) An image forming apparatus using a light scanning device.

In the present invention, integrally forming a combination of any two or more of these features brings about unique improved accuracy and advantages, and therefore the use of any combination of two or more of these features is covered by the present invention.

Figure 5:
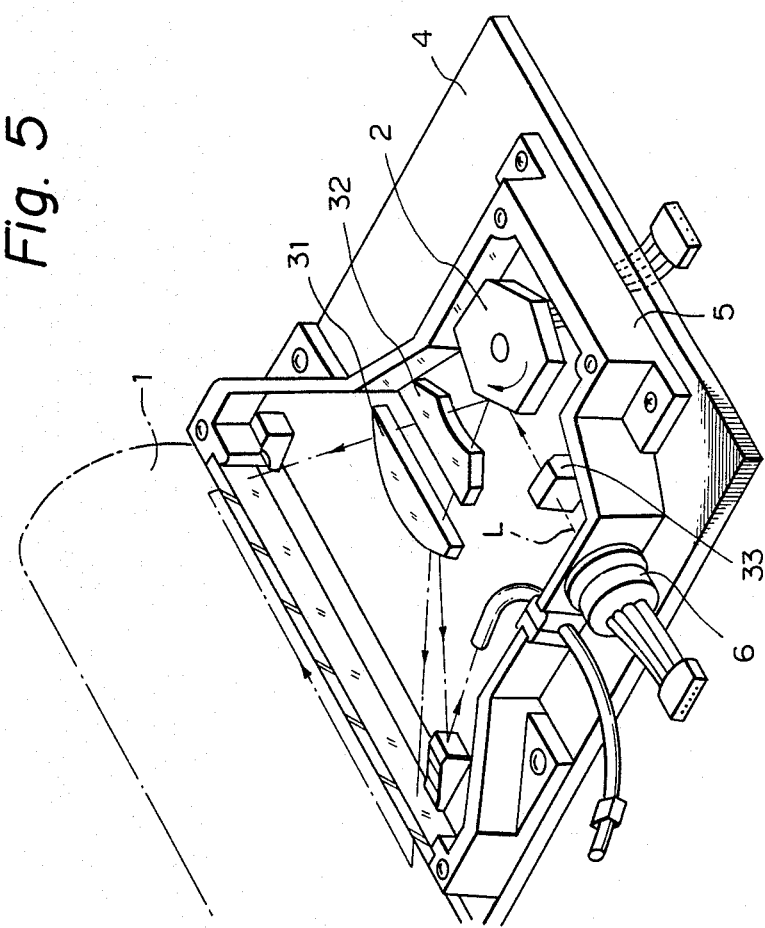
FIG. 5 shows the optical scanning device of the present invention and illustrates an outline of the present invention.

The outline of the present invention will first be described briefly with reference to FIG. 5.

A laser beam emitted from a laser output unit 6 is focused by a cylindrical lens 33, scanned by a polygon mirror 2, passes through imaging lenses 31 and 32, and is imaged on a photosensitive drum 1.

Reference numeral 5 designates an optical box integrally containing therein the laser output unit 6, light scanning means having the polygon mirror 2, and the imaging lenses 31, 32. The upper portion of the optical box 5 is hermetically sealed by a cover 27 of FIG. 10 to constitute a housing.

The optical box and the cover are molded articles formed of synthetic resin.

The housing constituted by the optical box and the cover is effective to prevent dust from adversely affecting the light beam, that is, to prevent dust from adhering to the lenses and reducing the transmittance thereof or prevent dust from adhering to the laser output unit and causing lack of recording information.

The invention will hereinafter be described with respect to the above-mentioned items in succession and with reference to the drawings.

(1) A light Scanning Means Holding Mechanism

FIG. 1 is a cross-sectional view of an embodiment of the present invention.

In FIG. 1, letter L designates a laser beam which is scanned by a rotational polygon mirror 2. The rotational polygon mirror 2 is rotated by a drive motor unit 17. The rotational polygon mirror 2 and the drive motor unit 17 together constitute light scanning means.

The drive motor unit 17 is provided with a supporting member formed integrally with a base member 5, and a printed substrate 24 mounted on the base member and controlling the amount of current flowing to a stator coil 21 to thereby eliminate the irregularity of rotation. Reference numeral 22 denotes a rotor magnet fixed to a rotary support shaft 10 and rotatable by an electromagnetic field produced by the stator coil 21.

Bearings 12 which are bearing members such as ball bearings or needle bearings are provided in the upper and lower end portions of the cylindrical supporting member 23. These bearings 12 are highly accurately assembled by adhesion or press-in fitting so as to maintain an accurate horizontal position and to maintain the rotary support shaft 10 of the rotational polygon mirror 2 rotatable supported on the bearings 12 vertical.

Such a construction in which the rotor magnet and the stator coil are horizontally opposed to each other can preferably minimize the height of the light scanning means.

The bearings 12 are supported by the supporting member 23 formed of the same material as the base member 5 and formed integrally with the base member 5. The supporting member 23 supporting the bearings 12 is formed integrally as a one-piece construction with the base member 5 as described above and therefore is provided highly accurately, and the positional accuracy and vertical accuracy of the rotary support shaft 10 are very high and even in a case where it is used in an image forming apparatus, formation of clear-cut images is ensured and assembly of the apparatus is very simple.

The above-mentioned material is a resin mixed with a carbon and slightly endowed with electrical conductivity.

Another embodiment will now be described with reference to FIGS. 2, 3 and 4.

Figure 2:
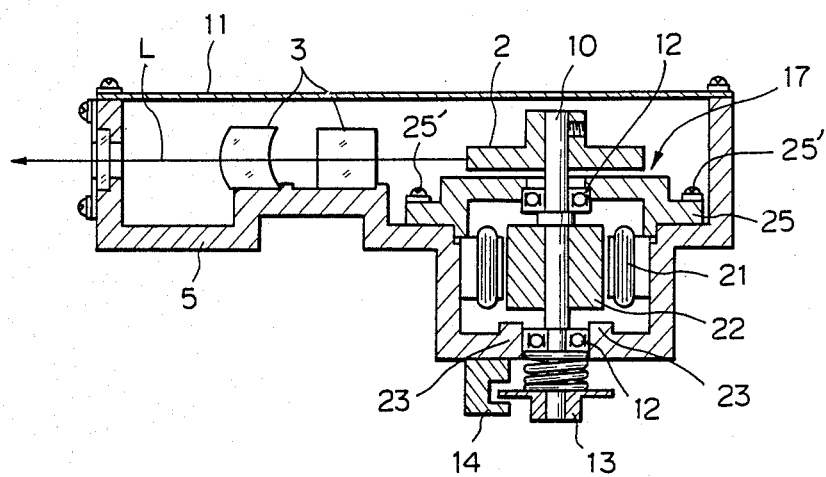
Figure 3:
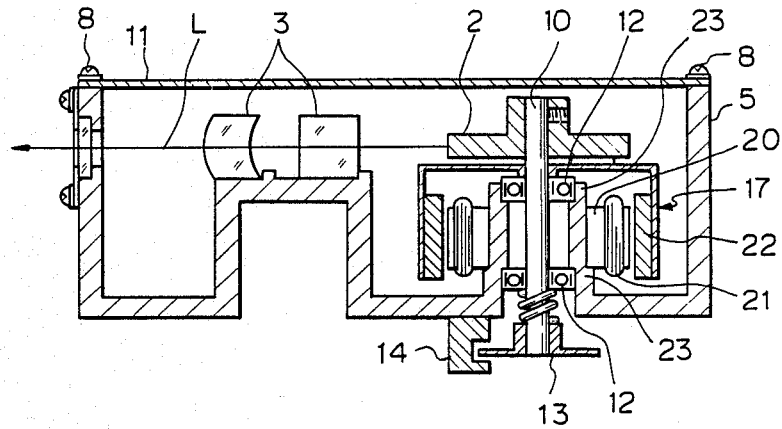
Figure 4:
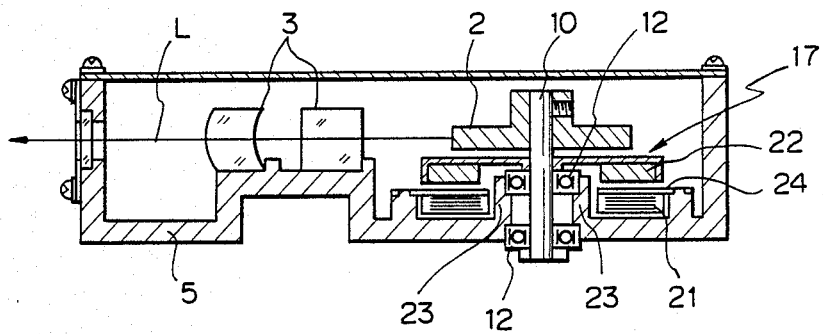

In FIGS. 2, 3 and 4, a base member 5 is a casing, and this base member 5 and a cover 11 together constitutes a housing which integrally contains therein a laser output unit (not shown), light scanning means 2 and an imaging lens 3.

The laser beam is greatly affected by minute dust and therefore, this housing is very effective to prevent the entry of dust. Also, the casing which provides the base frame of the housing is molded by a molding die, and its manufacture is simple and the irregularity of the manufacturing thereof is minimized.

FIG. 2 shows so-called inner rotor type light scanning means. A stator coil 21 is fixed to the base member 5, and a rotor magnet 22 is fixed to the rotary support shaft 10 of the rotation of polygon mirror 2. The lower portion of the rotary support shaft 10 is accurately supported by a lower bearing 12 which is held by a supporting member 23 formed integrally with the base member 5 and positioned highly accurately. The upper portion of the rotary support shaft 10 is supported by an upper bearing 12 which is held by another supporting member 25 attached to the base member 5 by means of screws. The position of rotary support shaft 10 is maintained with excellent positional accuracy by the supporting member 23 formed integrally with the base member 5, and may preferably be adjustably supported by a well-known method of endowing the screw setting with a fine adjustment in order to enhance the accuracies of the degree of parallelism and the degree of perpendicularity of the rotational polygon mirror 2.

In FIG. 2, reference numeral 13 designates a rotation controlling encoder fixed to the lower end of the rotary support shaft 10, and reference numeral 14 denotes a rotation control signal detecting element for the rotational polygon mirror 2.

The casing should desirably be formed by highly accurate plastic molding in order to keep the accuracy of the molding thereof highly accurate, but may also be molded by die casting, and particularly can be accurately molded even by secondary machining after the molding by die casting.

The material of this casing also is a resin mixed with carbon. Due to the mixture being of carbon, the casing becomes black and thus, the reflectance of the laser may be reduced so that the quantity of light of the laser leaked by an unexpected accident may be reduced.

FIG. 3 shows so-called outer rotor type light scanning means.

Both of the bearings 12 which support the upper and lower portions of the rotary support shaft 10 of the rotational polygon mirror 2 are held by the supporting member 23 provided highly accurately by being formed integrally with the base member 5.

The fact that the supporting member thus supports at least the upper and lower bearing members of the rotary support shaft provides high accuracy of positioning as well as high accuracies in the degree of parallelism and the degree of perpendicularity of the rotational polygon mirror, and this is a more preferred embodiment.

FIG. 4 shows the construction of the horizontally opposed type light scanning means shown in FIG. 1. The supporting member preferably supports the upper and lower bearing members of the rotary support shaft.

Also, as previously described, the height of the light scanning means can be minimized and this leads to the compactness of the apparatus. For example in FIG. 6, the printed substrate 24 is secured by screws to a screw setting portion 241 provided on the base member 5. Reference numeral 242 designates a projecting pin formed integrally with the base member 5 and fitted in a hole formed in the printed substrate 24, thereby positioning the printed substrate.

Another embodiment will now be described with reference to FIGS. 6 and 7.

Figure 6:
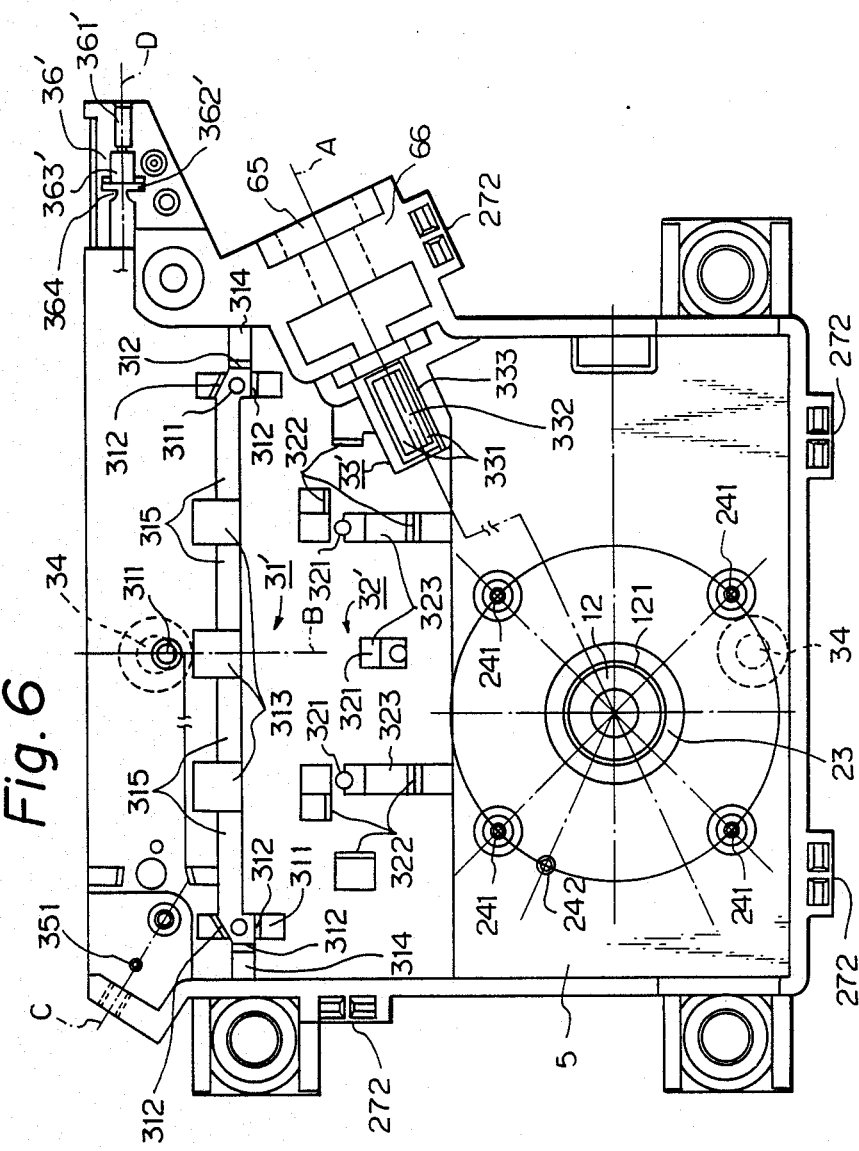
FIG. 6 is a top plan view of an embodiment of the casing of the present invention.

FIG. 6 is a cross-sectional view of a casing as it is seen from above.

In FIG. 6, a bearing member comprising a bearing 12 and a metal bush 121 is provided inside a cylindrical supporting member 23 formed integrally with the base member 5. By this metal bush 121 being provided, the abrasion of the supporting member by the influence of the rotational polygon mirror which rotates at a high speed can be prevented and the long life of the supporting member can be achieved and in addition, the area of contact of the supporting member with the bearing member can be increased to realize higher accuracy.

This metal bush makes the accuracy higher by being inserted into a molding die during the molding of the supporting member, i.e., during the manufacture of the base member, and by being molded in this die.

An embodiment using the afore-described horizontally opposed light scanning means in the casing will now be described with reference to FIG. 7.

FIG. 7 is a cross-sectional view taken along dot-and-dash line A in FIG. 6.

The rotary support shaft 10 is rotatable supported by two bearings 12 which are positioned by a metal bush 121. A bearing member comprising the bearings 12 and the bush 121 is held by a supporting member 23.

The metal bush is provided with a protrusion 232 which increases the holding ability of the supporting member and also accomplishes the positioning thereof.

A connecting portion which connects the base member 5 to the supporting member 23 is made thicker and stronger than the surroundings thereof as indicated at 231. The process of making the connecting portion thicker and stronger can be effected during the molding and is therefore very simple and effective. Also, this process of making the connecting portion stronger may be accomplished not only by making said connecting portion thicker, but also by molding a metal ring simultaneously therewith.

The base member 5 is provided with an integrally formed cylindrical protrusion 51. This protrusion 51 extends downwardly from the rotary support shaft 10 and prevents a shock from being applied to the rotary support shaft 10 to cause an error in the optical accuracy of the rotational polygon mirror when the housing is mounted or placed. Further, the consolidation by the above-described process of making the connecting portion stronger is further enhanced. Also, in some cases, the supporting member was damaged when the metal bush 121 was inserted after the molding of the casing, but the provision of this cylindrical protrusion 51 substantially leads to the consolidation of the supporting member which eliminates this damaging and also solves the problem encountered when the metal bush is inserted later.

Very high accuracy is required of a laser optical system and a slightest error in the optical accuracy may result in a deleterious influence, and the above-described construction in which the rotary support shaft does not strike against the housing when the latter is placed is much preferred.

In FIG. 7, an iron plate 211 is provided below a printed substrate to increase the electromagnetic field by a stator coil 21.

The center of the supporting member 5 which accurately positions a light deflecting member, namely, the center of rotation of the light deflecting member, is provided on the opposite side to the laser output unit 6 with respect to the optical center of lenses 31 and 32. By such a construction, the rotational polygon mirror 2 can be brought close to the lenses 31 and 32 and thus, compactness of the apparatus can be realized.

Although the light scanning means has been typically described as scanning a light by means of the rotational polygon mirror, the present invention is of course applicable to any light scanning means which scans with a light by rotating, such as a hologram.

Also, the bearings may also be fluid bearings such as pneumatic or liquid bearings. In this case, it is to be understood that in the present invention, even a construction in which the supporting member provides a wall for directing the fluid is covered by the expression that the bearing member is held.

Thus, it is apparent from the foregoing description that according to the present invention, the light scanning means can be provided very simply and highly accurately.

If the mounting accuracy of the light scanning means is low, the laser beam will be scanned in an undesired direction or in the worst case, cannot be scanned. With this taken into consideration, it will be appreciated that the present invention which enables high accuracy to be obtained by a simple construction is very effective.

The optical accuracy depends also on optical members other than the light scanning means. Therefore, it is very preferable that the lenses and the laser output unit be supported highly accurately. Description will hereinafter be continued on the basis of this viewpoint.

(2) An Imaging Member Holding Mechanism

The outline of this mechanism will first be described with reference to FIG. 6.

In FIG. 6, three imaging lenses for imaging the laser beam are contained in containing portions 31', 32' and 33', respectively. The holding mechanism for the containing portions 31' and 32' will hereinafter be described with reference to FIG. 8.

FIG. 8 is a perspective view of the holding mechanism.

The lens 31 is three-point-supported by a supporting portion 311 and has the fore and rear ends and sides thereof positioned by a member 312.

Reference numeral 313 designates an area lower in height by about 50 $\mu$m than the supporting portion 311. An adhesive layer is provided between this area 313 and the lens 31 to firmly secure the lens 31. No adhesive agent is applied to the lens supporting portion 311 and the lens is adhesively secured to the area 311 and therefore, the lens does not float up by adhesive agent, but high positional accuracy is obtained.

Such a lens holding member is formed integrally with the base member 5, and not only the positional accuracy of the lens itself is high but also the lens holding member is formed integrally with the supporting member 5 as mentioned above, and the relative positional relation thereof with the light scanning means is highly accurate and the imaging position is not deranged. Further, the optical center which provides the reference of the optical system is made firmly coincident with the light scanning means by the lenses. Therefore, the light scanning, device can realize light scanning of the optical path which is high in accuracy and excellent in reliability.

Also, a beam portion 315 is provided so as to connect the area 313. This beam portion 315 extends in the lengthwise direction of the casing and reinforces the casing. The beam portion 315 is also formed integrally with the base member 5. The beam portion 315 not only reinforces the casing, but also closes the gap in the lower portion of the lens to prevent the entry of dust.

The lens 32 is held in the same manner as the lens 31, and is three-point-supported by a lens supporting portion 321 and positioned by a member 322. An adhesive agent is applied to an area 323. This lens holding member is also formed integrally with the base member 5.

Description will now be made of a dust proof mechanism attendant to the holding of the lens 31. Dust proofing of the lower portion of the lens is accomplished by a beam portion 315.

Protrusions 314 formed integrally with the base member 5 are provided on the opposite side edges of the lens 31. These protrusions 314 are closed with respect to the lens 31. The protrusions 314 may most preferably bear against the lens 31, but may be slightly separate from the lens 31 in practice.

Dust proofing of the upper portion of this lens will now be described.

Figure 9:
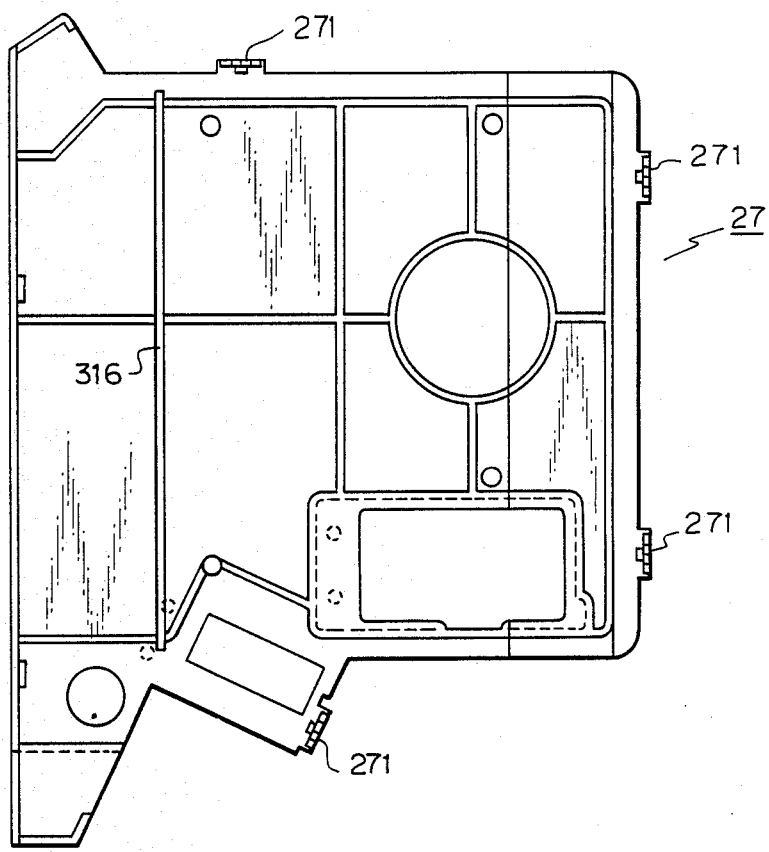
FIG. 9 is a bottom plan view of a cover member in an embodiment of the present invention.
Figure 10:
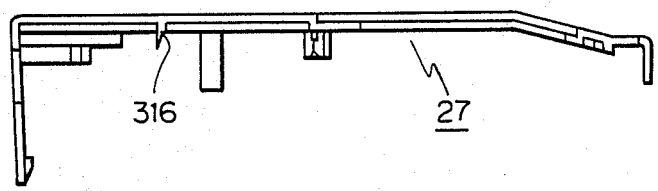
FIG. 10 is a cross-sectional view of the embodiment shown in FIG. 9.

FIGS. 9 and 10 show the cover 27 of the casing constituted by the base member 5.

FIG. 9 is a bottom plan view of the cover. This cover is provided with a protrusion 316 formed integrally therewith. The cover 27 is also provided with four coupling portions which are coupled to the coupling portions 272 of the casing shown in FIG. 6 to constitute a housing.

The protrusion 316 has its end tapered and inclined as shown in the cross-sectional view of FIG. 10.

The protrusion 316 is closed with respect to the upper surface of the lens 31 and thus, the upper portion of the lens is also dust-proofed. This protrusion 316 may also preferably bear against or be in pressure contact with the lens, but may be slightly spaced apart from the lens in practice.

Since its end is inclined, the protrusion 316 has high pressure of contact and the degree of intimate contact is large. Also, even if the irregularity of incorporation of the cover and the casing occurs and the relative height relation between the lens and the protrusion 316 varies and these elements become too close to each other, the pressure can be absorbed by said inclination. This effect can be achieved also by making the end of the protrusion 316 thin, and the effect of the combination of these features becomes greater.

The laser optical system is such that decreased optical performance of the laser is caused even by minute dust, or irregularity of scanning is caused by variations in transmittance and reflectance, and for this reason, the upper portion, the side edge portion and the lower portion of the lens are securely dust-proofed in this manner and thus, little or no dust enters the housing and highly reliable scanning of the laser beam can be realized.

The holding of the lens 33 will be described below with the adjusting mechanism.

(3) A Laser Output Unit Holding and Lens Adjusting Mechanism

This will hereinafter be described with reference to FIGS. 6 and 7.

In FIG. 7, the laser output unit comprises a laser chip 61, a lens 62 for collecting the laser beam, and members 63 and 64 for containing the laser chip 61 and the lens 62.

The laser output unit 6 is inserted, contained and positioned in a mating hole 65 indicated by dotted line in FIG. 6.

A containing portion 66 forming the mating hole 65 is formed integrally with the base member 5, and the laser output unit 6 is firmly secured to the supporting portion 66 by means of a screw.

The positional accuracies of the laser output unit 6 and the light scanning means, and particularly the optical accuracy of the laser beam travelling from the laser output unit toward the rotational polygon mirror, must be very high. If these accuracies are erroneous, the rotational polygon mirror will scan the laser beam in an undesired direction and will become unusable as an optical scanning device.

According to the present invention, the supporting member 23 and the supporting portion 66 of the laser output unit are formed integrally with each other and therefore, the optical accuracy is very high.

The laser beam put out from the laser output unit 6 held highly accurately in this manner has its diameter in the direction of height of the cylindrical lens 33, i.e., the focus on the imaging plane, determined by the cylindrical lens 33, and then travels toward the rotational polygon mirror.

The cylindrical lens 33 is also supported by a containing portion 33 formed integrally with the base member 5. As shown in FIG. 6, the containing portion 33', like the holding mechanism for the lenses 31 and 32, has supporting portions 331 for supporting the cylindrical lens 33 and an area 332 lower in height by 50 $\mu$m than the supporting portions 331, and an adhesive layer is provided between the cylindrical lens 33 and the area 332 to firmly secure the cylindrical lens to the area 332.

The supporting portions 331 are provided on the opposite sides of the area 332 to which the adhesive is applied. By the supporting portions 331 being thus provided on the opposite sides, the degree of horizontality of the cylindrical lens 33 is kept highly accurate.

However accurately the laser output unit is supported, irregularity of the laser chip itself cannot be prevented.

If the angle of emergence of the output beam from the laser chip differs, the accuracy of scanning of the laser beam will be extremely reduced.

The cylindrical lens 33 corrects the irregularity of the angle of emergence of the laser beam by the irregularity of the laser chip and causes the laser beam to travel toward the light scanning means.

Also, the cylindrical lens 33 determines the diameter of the laser beam in the direction of height of the lens, that is, lens 33, determines the focus of the laser beam.

The laser beam is adjusted by the position of this cylindrical lens. This adjustment refers to what has generally been described previously.

The focus of the laser beam becomes delicately different due to the aforementioned irregularity of the laser chip and the irregularity of the cylindrical lens itself. It is therefore preferable that adjustment of the mounted position of the cylindrical lens 33 be possible when this lens is mounted. This adjustment is accomplished by being effected in the direction of emergence of the laser beam. The degree of parallelism of the laser beam is very much desired for the adjustment of the mounted position of the cylindrical lens for the adjustment of the focus. If the degree of parallelism is reduced, the aforementioned correction effect of the laser beam travelling toward the rotational polygon mirror will be decreased.

A mechanism for adjusting the mounted position of the cylindrical lens 33 will now be described.

As shown in FIGS. 6 and 7, a wall portion 333 formed integrally with the containing portion 33' for the cylindrical lens 33, that is, formed integrally with the base member 5, and parallel to the laser beam is provided. This wall portion 333 is formed integrally with all of the supporting member 5, the containing portion 33' for the cylindrical lens and the containing portion 66 for the laser output unit 6, and the degree of parallelism thereof to the laser beam is highly accurate.

The cylindrical lens 33 permits its fine analogous adjustment to be accomplished in parallelism to the laser beam by its side being positionally adjusted along the wall portion 333 when the cylindrical lens is mounted.

By this adjustment, the focus of the laser beam can be adjusted without negatively affecting the angle correcting ability of the laser beam travelling toward the rotational polygon mirror and therefore, the laser beam scanned has a very high degree of accuracy.

(4) A Beam Detecting Mechanism

In the light scanning device, it is widely practised to detect the scanning position of the laser beam.

Thus, a beam detector for detecting the laser beam must be held very accurately.

If the mounting accuracy of this beam detector is low, the beam detector will detect the wrong scanning position.

The holding mechanism for the beam detector in the embodiment of the present invention will hereinafter be described with reference to FIGS. 6 and 11.

FIG. 11A is a cross-sectional view taken along dot-and-dash lines B, C and D.

The laser beam L scanned by the rotational polygon mirror passes through the imaging lenses 32 and 31 and, when the scanned position of the laser beam having passed through the imaging lenses is on a mirror 352, the laser beam is reflected by this mirror 352, and part of the reflected scanning laser beam is detected by beam detecting means 36 and enters an optical fiber 361.

Reflecting means 35 having the mirror 352 comprises a metal fitting 353 on which the mirror 352 is mounted and a plate spring 354 for holding the mirror 352.

This reflecting means has a reference pin 351 formed integrally with the base member 5, which reference pin is inserted and positioned in the mating hole of the metal fitting 353 and secured by a screw 355.

The state of this positioning is shown in FIG. 11B.

The metal fitting 353 has therein a screw-setting hole with the reference pin 351 as the center of rotation, and the reflecting means 35 is rotatable about the reference pin 351.

Since this reference pin is formed integrally with the base member 5, the positional accuracy thereof and the positional accuracy thereof relative to the lenses and the rotational polygon mirror are very high and the mounting accuracy of the reflecting means is excellent. Also, since the reflecting means is rotatable about the reference pin, the irregularity of the reflecting means itself can be coped with and the accuracy thereof is further enhanced. When it is desired to detect a different beam scanning position, adjustment can be simply accomplished by this rotatable construction.

The holding mechanism for beam detecting means will now be described.

The beam detecting means 36 comprises an optical fiber 361 for passing the laser beam therethrough, a connecting portion 363 for passing the laser beam to the optical fiber, and a condensing lens 362 for condensing the laser beam. This beam detecting means 36 is formed integrally with the base member and positioned and held in a containing portion 36' of high positional accuracy.

This holding mechanism will hereinafter be described in greater detail with reference to FIG. 6.

The containing portion 36' comprises a first containing portion 361' for containing the optical fiber therein, a second containing portion 362' for containing the connecting portion therein, and a third containing portion 363' for containing the lenses therein. Also, the containing portion 36' itself forms a slit 364 and stops down the laser beam entering the lenses and thereby further enhances the detection accuracy.

Since the beam detecting means is thus supported and positioned by the containing portion 36' formed integrally with the base member, the positional accuracy thereof relative to the reflecting means 35 is also very high and the beam detecting means can reliably detect the beam scanning position.

(5) A Countermeasure for Preventing Noise

The rotational polygon mirror which is rotated at a high speed is friction-charged and this charge provides noise which may cause irregularity of the rotation of the polygon mirror or in the worst case, may cause malfunctioning of the control circuit.

An embodiment of the present invention having a countermeasure for such noise will hereinafter be described.

A ring-like electrode 37 having a terminal 371 as shown in FIG. 12A is fitted into a metal bush and is molded simultaneously with the base member 5. The ring portion of this electrode 37 is embedded in the supporting member 23 and only the terminal 371 is exposed from the base member 5. By the terminal 371 being grounded, the charge generated by the bearings 12 and the rotary support shaft 10 flows out from the terminal 371 through the metal bush and thus, noise is not produced. Alternatively, a terminal may be provided on the metal bush 121 itself and may be grounded. In this case, the construction will become simpler.

Also, the charge accumulated around the light scanning means may cause irregularity of the rotation of the rotational polygon mirror. To prevent this, the portions of the base member 5 and the cover member 27 which are adjacent to the light scanning means may be coated with an electrically conductive material and grounded, or the base member 5 may be made electrically conductive and further grounded. In the present embodiment, the base member 5 has carbon mixed therewith and is therefore electrically conductive and thus, it has such a noise preventing effect.

Thus, according to the present embodiment of the invention, the irregularity of the rotation of the rotational polygon mirror and the malfunctioning of the control circuit which would otherwise result from the friction charge can also be prevented.

(6) Light Scanning by a Plurality of Laser Beams

In speeding up the light scanning of the light scanning device, light scanning by a plurality of laser beams is used.

Such light scanning by a plurality of laser beams will hereinafter be described with reference to FIG. 13.

Figure 13:
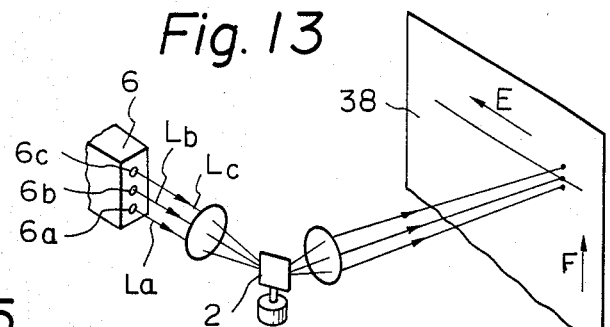
FIG. 13 illustrates the light scanning by a plurality of laser beams of the present invention.
Figure 15:
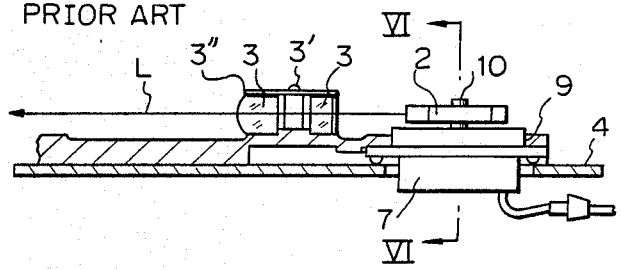
FIGS. 15 and 16 are cross-sectional views showing an example of prior art.
Figure 16:
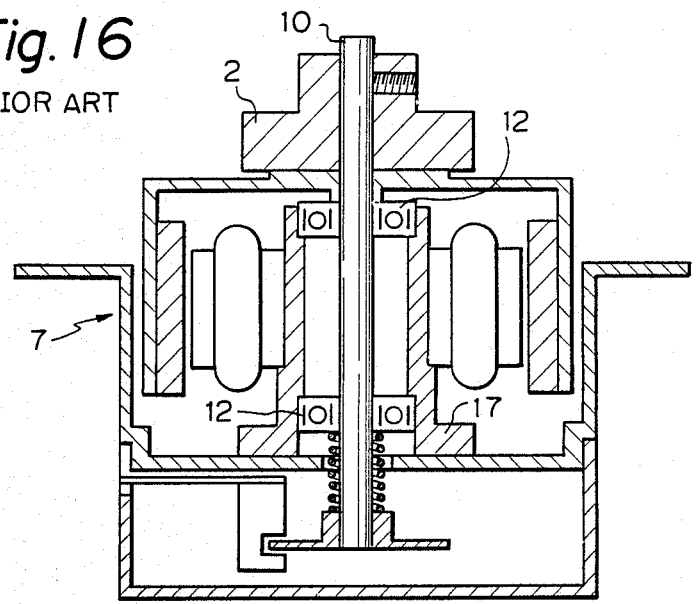

FIG. 13 is a schematic perspective view of a laser beam printer.

The laser output unit 6 is a laser array having semiconductor laser chips 6a, 6b and 6c. These semiconductor laser chips 6a, 6b and 6c. are individually light-modulated in conformity with recording information. Three laser beams La, Lb and Lc emitted from the laser output unit 6 are light-scanned in the direction of arrow E on a scanning surface 38 by the same rotational polygon mirror 2 and the scanning surface is moved in the direction of arrow F and two-dimensionally scanned.

By this two-dimensional scanning, an image corresponding to the recording information is formed on the scanning surface 38.

By the scanning in the direction of arrow E being thus effected by three beams, the two-dimensional scanning, speed on the scanning surface 38 is three times faster as compared with the scanning by a single beam.

The light scanning by a plurality of beams is thus effected at a high speed, while the same optical member such as light scanning means or a lens is used as the optical member for a plurality of beams and the relative positional accuracies of the respective beams are required and therefore, higher optical accuracy is required than in the case of a single beam.

Therefore, it will be seen that the present invention in which the base member 5 and the supporting member 23 are formed integrally with each other and further the supporting portion and containing portion for other optical members are formed integrally with each other to thereby enable high optical accuracy to be obtained is particularly effective in the light scanning by a plurality of laser beams which thus requires very high accuracy.

Also, in the light scanning by a laser array having a plurality of semiconductor laser chips, it is considered to incline the laser array in order to increase the resolution of the light scanning.

Inclining the laser array will now be described with reference to FIG. 8.

Even in the laser array, it is difficult to bring the laser chips very close to one another, and where scanning is effected by a plurality of beams, there is produced a spacing of $d_1$ between the adjacent beams as shown in FIG. 8A. This beam spacing $d_1$ cannot be light-scanned and therefore, the resolution of the light scanning cannot be improved even though a high speed of the light scanning can be achieved.

In contrast, by inclining the laser array as shown in FIG. 8B, the beam spacing $d_2$ becomes $d_2 < d_1$ and thus, the resolution of the light scanning can also be improved.

If irregularity occurs to the angle of inclination $\theta$, irregularity will occur also in the resolution and thus, the resolution will be extremely reduced.

Also, it is necessary to control the beam scanning starting position in conformity with the angle of inclination $\theta$, and if there is irregularity of this angle $\theta$, the resolution will be reduced and the light scanning will be of low reliability.

Therefore, it will be seen that the present invention in which the laser output unit 6 is highly accurately held and positioned by the containing portion formed integrally with the base member 5 and the supporting member 23 is particularly effective. Of course, this also holds true of the cylindrical lens adjusting mechanism and the beam detecting mechanism.

(7) An Image Forming Apparatus Using a Light Scanning Device

Description will now be made of an image forming apparatus using a light scanning device to form an image on an image bearing member.

Figure 14:
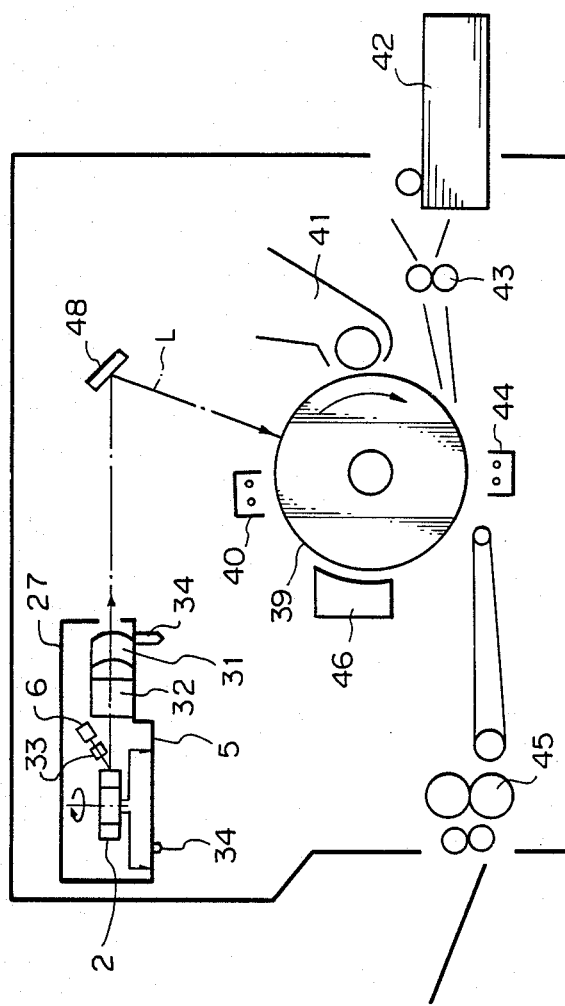
FIG. 14 is a cross-sectional view of the image forming apparatus of the present invention.

FIG. 14 is a cross-sectional view of a laser beam printer to which the present invention is applied.

FIG. 14 will hereinafter be described.

The laser beam printer includes a photosensitive member 39 which is in the form of a drum rotatable in the direction of arrow. Around the photosensitive drum 39, there are provided a charger 40 for uniformly charging the surface of the photosensitive drum 39 and developing means 41 for developing an image on the photosensitive drum 39. The printer further includes a paper feed cassette 42, registration rollers 43, an image transfer charger 44, image fixing means 45 and a cleaner 46.

The laser output unit 6 contained in a containing portion formed integrally with the base member 5 emits a laser beam light-modulated in conformity with recording information by an extreneous signal, and this laser beam emerges from a housing comprised of the base member 5 and the cover member 27 through a cylindrical lens 33, a rotatable polygon mirror 2 and imaging lenses 32, 31 highly accurately held and positioned by the supporting portion and containing a portion formed integrally with the base member 5, and scans the photosensitive drum 39 through a mirror 48 and thus, an electrostatic pattern corresponding to the recording information is formed on the photosensitive drum 39.

Reference numeral 34 designates a housing positioning member formed integrally with the base member 5 and provided on the underside of the base member. This positioning member 34 is provided so as to coincide with the optical center line of the imaging lenses and is highly accurately positioned with the photosensitive drum 39 and the mirror 48.

The electrostatic pattern is then visualized by the developing means 41. The visualized image is then transferred by the transfer charge 44 onto a transfer material fed from the feed cassette 42. The transfer material bearing the visualized image thereon is conveyed to the fixing means 45, whereat the image is fixed thereon. The transfer material is then discharged out of the apparatus. On the other hand, the residual developer remaining on the photosensitive drum 39 is removed therefrom by cleaning means 46 to make it ready for the next image formation.

In such an image forming apparatus to which the present invention is applied, optical accuracies such as the light scanning position and the focus of the laser beam on the photosensitive drum 39 are very high and therefore, clear-cut and undisturbed images can be obtained.

The present invention has been described above in detail in the order of items, and the present invention freely permits combinations thereof and of course, covers all combinations thereof.

What is claimed is:

1. A light scanning device having:
   light scanning means for scanning with a light beam;
   said light scanning means having a light deflecting member rotated to scan with the light beam and deflecting the light beam, and bearing means for rotatable supporting said light deflecting member;
   a supporting member for holding at least a part of said bearing means; and
   a base member formed integrally as a one-piece construction with said supporting member;
   said base member having a first containing portion for containing and positioning therein a light output unit which puts out the light beam, and a second containing portion for containing and positioning therein an imaging lens for imaging the light beam deflected by said light deflecting member, the positional relation among said first containing portion, said second containing portion and said supporting member being determined by integral one-piece construction formation, the optical path accuracy of said light beam being improved.

2. A light scanning device according to claim 1, wherein said base member exposes a part of said light scanning means to the other surface opposite to the supporting side surface of said light scanning means and holds the same, and said exposed part is protected by the bottommost portion provided on said other surface of said base member and protruding to the opposite side to said supporting side surface.

3. A light scanning device according to claim 1, wherein said bearing member is mounted with respect to said supporting member after the molding of said supporting member, and said base member has a cylindrical protrusion protruding to the opposite side to said supporting member on the other surface corresponding to said supporting member and opposite to the supporting side surface of said light scanning means.

4. A light scanning device according to claim 1, wherein said bearing means has a bearing directly supporting said light deflecting member and a metal bush supporting said bearing, and said supporting member supports said metal bush.

5. A light scanning device according to claim 4, wherein said metal bush is mounted with respect to said supporting member after the molding of said supporting member, and said base member has a cylindrical protrusion protruding to the opposite side to said supporting member on the other surface corresponding to said supporting member and opposite to the supporting side surface of said light scanning means.

6. A light scanning device according to claim 4, wherein said metal bush and said supporting member are molded at the same time.

7. A light scanning device according to claim 4, wherein said metal bush is grounded.

8. A light scanning device according to claim 7, wherein an electrode for grounding said metal bush is formed simultaneously with said supporting member and is within said supporting member and further is exposed from said base member and said supporting member.

9. A light scanning device according to claim 1, wherein said supporting member and said base member are of the same material which is a resin mixed with carbon.

10. A light scanning device according to claim 1, further having a cover member for covering the upper side of said base member and wherein said base member and said cover member together form a housing.

11. A light scanning device according to claim 10, wherein said base member is close to the side edge of a lens and is formed integrally with a protrusion provided on said second containing portion which prevents entry of dust.

12. A light scanning device according to claim 10, wherein a protrusion which is close to the upper surface of a lens and prevents entry of dust is formed integrally with said cover member.

13. A light scanning device according to claim 12, wherein said protrusion formed integrally with said cover member has at least its end inclined.

14. A light scanning device according to claim 13, wherein said protrusion formed integrally with said cover member has its end tapered.

15. A light scanning device according to claim 1, wherein the connecting portion between said supporting member and said base member is subjected to a reinforcing treatment.

16. A light scanning device according to claim 15, wherein the connecting portion between said supporting member and said base member is reinforced by being made thicker than the surroundings thereof.

17. A light scanning device according to claim 1, wherein said supporting member is formed integrally with said base member so that the center of rotation of said light deflecting member is positioned on the opposite side to the laser output unit with respect to the optical center of said imaging lens.

18. A light scanning device according to claim 1, wherein said second containing portion has a supporting portion for supporting the imaging lens and an area lower in height than said supporting portion, and an adhesive layer is provided between said area and said imaging lens, whereby said imaging lens is held.

19. A light scanning device according to claim 1, wherein said light scanning means effects the scanning with a plurality of laser beams.

20. A light scanning device according to claim 19, wherein said laser output unit is a laser array having a plurality of laser chips, and said light scanning means effects the scanning with a plurality of laser beams put out from said laser array.

21. A light scanning device according to claim 20, wherein said first containing portion holds said laser array in its inclined state.

22. A light scanning device having:
   light scanning means for scanning with a light beam;
   said light scanning means having a light deflecting member rotated to scan with the light beam and deflecting the light beam, and bearing means for rotatably supporting said light deflecting member;
   a supporting member for holding at least a part of said bearing means; and
   a base member formed integrally as a one-piece construction with said supporting member;
   said base member having one containing portion for containing and positioning therein a light output unit which puts out the light beam, and another containing portion for containing and positioning a cylindrical lens between said light scanning means and said light output unit, the positional relation among said supporting member, said first containing portion and said another containing portion being determined by integral one-piece construction formation, the optical path accuracy of said light beam being improved, said cylindrical lens being substantially capable of adjusting the light beam travelling from said light output unit toward said light scanning means.

23. A light scanning device according to claim 22, wherein said another containing portion has a supporting portion for supporting said base member and said cylindrical lens, and an area lower in height than said supporting portion, and an adhesive layer is provided between said are and said cylindrical lens.

24. A light scanning device according to claim 23, wherein said supporting portion for supporting said cylindrical lens is provided at either side of said area in which the adhesive layer is provided.

25. A light scanning device according to claim 22, wherein said another containing portion has a wall portion formed integrally with said base member and parallel to the light beam, and said cylindrical lens is adjustable along said wall portion and is fixed after being adjusted.

26. A light scanning device according to claim 23, wherein said another containing portion has a wall portion formed integrally with said base member and is parallel to the light beam, and said cylindrical lens is adjustable along said wall portion and is adhesively fixed after being adjusted.

27. A light scanning device according to claim 22, wherein said base member exposes a part of said light scanning means to the other surface opposite to the supporting side surface of said light scanning means and holds the same, and said exposed part is protected by the bottommost portion provided on said other surface of said base member and protruding to the opposite side to said supporting side surface.

28. A light scanning device according to claim 22, wherein said light output unit is a laser array having a plurality of laser chips, and said cylindrical lens substantially adjusts a plurality of laser beams put out from said laser array.

29. A light scanning device according to claim 28, wherein said one containing portion holds said laser array in its inclined state.

30. A light scanning device having:
light scanning means for scanning with a laser beam;
said light scanning means having a light deflecting member rotated to scan with the laser beam and deflecting the laser beam, and bearing means for rotatably supporting said light deflecting member;
a supporting member for holding at least a part of said bearing means;
a base member formed integrally as a one-piece construction with said supporting member;
beam detecting means for detecting the position of the beam;
reflecting means for directing the laser beam to said beam detecting means; and
a supporting portion for rotatably supporting said reflecting means, said supporting portion being formed integrally as a one-piece construction with said base member.

31. A light scanning device according to claim 30, wherein said supporting portion has a rotary shaft formed integrally with said base member, and said reflecting means has a mirror rotatable about said rotary shaft.

32. A light scanning device according to claim 30, wherein said base member has a containing portion formed integrally therewith for integrally supporting and positioning said beam detecting means.

33. A light scanning device according to any of claim 32, wherein said beam detecting means has a lens for converging the laser beam, and said base member has a containing portion formed integrally therewith for integrally supporting and positioning said lens.

34. A light scanning device according to claim 33, wherein said beam detecting means has an optical fiber for inputting the laser beam passed through said lens, and said base member has a containing portion formed integrally therewith for integrally supporting and positioning said optical fiber.

35. A light scanning device according to claim 32, wherein said base member has a slit formed integrally therewith for controlling the laser beam entering said lens.

36. A light scanning device according to claim 34, wherein said base member has a slit formed integrally therewith for controlling the laser beam entering said lens.

37. A light scanning device according to claim 30, wherein said base member exposes a part of said scanning means to the other surface opposite to the supporting side surface of said light scanning means and holds the same, and said exposed part is protected by the bottommost portion provided on said other surface of said base member and protruding to the opposite side to said supporting side surface.

38. A light scanning device according to claim 30, wherein said bearing means is mounted with respect to said supporting member after the molding of said supporting member, and said base member has a cylindrical protrusion protruding to the opposite side to said supporting member on the other surface corresponding to said supporting member and opposite to the supporting side surface of said light scanning means.

39. A light scanning device according to claim 30, wherein said light scanning means scans with a plurality of beams, and said beam detecting means detects at least one of said plurality of beams.

40. An image forming apparatus for forming an image on an image bearing member by the use of a light scanning device, having:
a laser output unit putting out a laser beam modulated in conformity with image information to be recorded;
light scanning means for scanning with the laser beam put out from said laser output unit;
said light scanning means having a light deflecting member rotated to scan with the laser beam and deflecting the laser beam, and bearing means for rotatably supporting said light deflecting member;
an imaging member for imaging the laser beam scanned by said light scanning means; and
a housing integrally formed as a one-piece construction containing therein at least said laser output unit, said light scanning means and said imaging member;
said housing having a supporting member for supporting said bearing means, and a base member formed integrally as a one-piece construction with said supporting member;
the laser beam which has emerged from said housing scanning the image bearing member on which a latent image is to be formed, thereby forming a recorded image thereon.

41. An image forming apparatus according to claim 40, wherein said light scanning means scans with a plurality of laser beams.

42. An image forming apparatus according to claim 41, wherein said laser output unit is a laser array having a plurality of laser chips, and said light scanning means scans with a plurality of laser beams put out from said laser array.

43. An image forming apparatus according to claim 42, wherein said laser array is disposed in its inclined state.

44. An image forming apparatus according to claim 40, wherein said bearing means has a bearing directly supporting said light deflecting member and a metal bush supporting said bearing, and said supporting member supports said metal bush.

45. An image forming apparatus according to claim 44, wherein said metal bush is mounted with respect to said supporting member after the molding of said supporting member, and said base member has a cylindrical protrusion protruding to the opposite side to said supporting member on the other surface corresponding to said supporting member and opposite to the supporting side surface of said light scanning means.

46. An image forming apparatus according to claim 40, wherein the connecting portion between said base member and said supporting member is subjected to a reinforcing treatment.

47. An image forming apparatus according to claim 46, wherein the connecting portion between said base member and said supporting member is reinforced by being made thicker than the surroundings thereof.

48. An image forming apparatus according to claim 40, wherein said base member exposes a part of said light scanning means to the other surface opposite to the supporting side surface of said light scanning means and holds the same, and said exposed part is protected by the bottommost portion provided on said other surface of said base member and protruding to the opposite side to said supporting side surface.

49. An image forming apparatus according to claim 44, wherein said metal bush is grounded.

50. An image forming apparatus according to claim 40, wherein a part of said light scanning means is exposed from said base member, and an air stream produced by a fan provided in said image forming apparatus passes the vicinity of said exposed part.

51. An image forming apparatus according to claim 40, wherein said base member has a positioning portion integrally formed therewith at the bottom thereof and corresponding to the optical center of an imaging lens.

52. An image forming apparatus according to claim 40, wherein said image bearing member is a photosensitive drum contained in said image forming apparatus.

53. An image forming apparatus according to claim 40, wherein a containing portion for supporting and positioning at least one of said beam output unit and said imaging member therein is formed integrally with said base member.

54. An image forming apparatus according to claim 53, wherein a supporting portion for supporting a mirror for directing the laser beam to the imaqe bearing member is formed integrally with said base member.

55. An image forming apparatus according to claim 53, wherein said imaging member is at least one of a cylindrical lens, an imaging lens and a slit.

56. A light scanning device comprising:
a laser unit for emitting a laser beam;
light scanning means for scanning with said laser beam emitted from said laser unit, said light scanning means having a light deflecting member rotated to scan with the laser beam and deflecting the laser beam, and bearing means for rotatably bearing said light deflecting member;
a supporting member for supporting said bearing means; and
a positioning portion for positioning said laser unit;
wherein said supporting member and said positioning portion are integrally molded in a one-piece construction.

57. A light scanning device according to claim 56, wherein said light scanning device is adapted to be mounted on a recording apparatus body having a photosensitive member and the position of said light scanning device is defined by said integrally molded body.

58. A light scanning device according to claim 56, wherein said bearing means has two bearings and said integrally molded body supports said two bearings.

59. A light scanning device according to claim 56, wherein said bearing means has a bearing directly supporting said light deflecting member and a metal bushing supporting said bearing and said supporting member supports said metal bushing.

60. A light scanning device according to claim 59, wherein said metal bushing and said supporting member are integrally molded.

61. A light scanning device according to claim 56, wherein said bearing means is electrically grounded.

62. A light scanning device according to claim 56, wherein said supporting member and said positioning portion comprise an integrally molded body composed of a resin including carbon.

63. A light scanning device comprising:
light scanning means for scanning with a laser beam, said light scanning means having a light deflecting member rotated to scan with the laser beam and deflecting the laser beam, and a bearing means for rotatably bearing said light deflecting member;
a supporting member for supporting said bearing means;
imaging means for imaging the laser beam deflected by said light deflecting member; and
a positioning portion for positioning said imaging means,
wherein said supporting member and said positioning portion are integrally molded in a one-piece construction.

64. A light scanning device according to claim 63, wherein said light scanning device is adapted to be mounted on a recording apparatus body having a photosensitive member and the position of said light scanning device is defined by said integrally molded body.

65. A light scanning device according to claim 63, wherein said bearing means has two bearings and said integrally molded body supports said two bearings.

66. A light scanning device according to claim 63, wherein said bearing means has a bearing directly supporting said light deflecting member and a metal bushing supporting said bearing and said supporting member supports said metal bushing.

67. A light scanning device according to claim 66, wherein said metal bushing and said supporting member ar integrally molded.

68. A light scanning device according to claim 63, wherein said bearing means is electrically grounded.

69. A light scanning device according to claim 63, wherein said positioning portion and said supporting member comprise an integrally molded body composed of a resin including carbon.

70. A light scanning device comprising:
 a housing having a laser unit for emitting a laser beam and light deflecting means for deflecting light by rotation to scan with the laser beam emitted from the laser unit;
 wherein at least a portion of said housing adjacent to said light deflecting means is treated so as to be electrically conductive.

71. A light scanning device according to claim 70, wherein said treated portion of said housing is electrically grounded.

72. A light scanning device according to claim 70, further comprising bearing means for rotatably supporting said light deflecting means, wherein said bearing means is electrically grounded.

73. A light scanning device according to claim 72, wherein said bearing means has an electrically grounded, metal bushing.

74. A light scanning device according to claim 70, wherein said housing further has a substrate for controlling the rotation of the light deflecting means inside thereof.

75. A light scanning device comprising:
 light scanning means for scanning with a laser beam, said light scanning means having a light deflecting member rotated to scan with the laser beam, and bearing means for rotatably bearing said light deflecting member;
 wherein said bearing means is electrically grounded.

76. A light scanning device according to claim 75, further comprising a metal ring in a contact with a periphery of said bearing means through which said bearing means is electrically grounded.

77. A light scanning device according to claim 75, wherein said bearing means has two bearings with which said metal ring is in contact.

78. A light scanning device according to claim 75, wherein said bearing means is a ball bearing.

* * * * *

UNITED STATES PATENT AND TRADEMARK OFFICE
CERTIFICATE OF CORRECTION

PATENT NO. : 4,800,401

DATED : January 24, 1989

INVENTOR(S) : HIDEKI SATO, ET AL. — Page 1 of 2

It is certified that error appears in the above-identified patent and that said Letters Patent is hereby corrected as shown below:

IN [54] TITLE

"LASLER" should read --LASER--.

COLUMN 1

Line 3, "LASLER" should read --LASER--.
    Line 46, "20" should be deleted.

COLUMN 3

Line 52, "2 rotatable" should read --2 rotatably--.

COLUMN 5

Line 33, "rotatable" should read --rotatably--.

COLUMN 13

Line 9, "rotatable" should read --rotatably--.

COLUMN 15

Line 12, "said are" should read --said area--.

UNITED STATES PATENT AND TRADEMARK OFFICE
CERTIFICATE OF CORRECTION

PATENT NO. : 4,800,401
DATED : January 24, 1989
INVENTOR(S) : HIDEKI SATO, ET AL.

It is certified that error appears in the above-identified patent and that said Letters Patent is hereby corrected as shown below:

COLUMN 16

Line 26, "said scan-" should read --said light scan- --.

Signed and Sealed this

Sixteenth Day of January, 1990

Attest:

JEFFREY M. SAMUELS

*Attesting Officer*   *Acting Commissioner of Patents and Trademarks*